United States Patent [19]

Dunford

[11] Patent Number: 5,718,436
[45] Date of Patent: Feb. 17, 1998

[54] FLOW CONTROLLER FOR MECHANICAL SEAL PROTECTION

[76] Inventor: Joseph R. Dunford, 1310 Rocky Lake Drive, P.O. Box 538, Waverley, Nova Scotia, Canada, B0N 2S0

[21] Appl. No.: 681,999

[22] Filed: Jul. 30, 1996

[51] Int. Cl.⁶ ..................................................... F16J 15/40
[52] U.S. Cl. .................. 277/68; 277/23; 277/24; 277/67; 277/134
[58] Field of Search ........................ 277/18, 23, 24, 277/25, 67, 68, 92, 134, 57, 53, 69

[56] References Cited

U.S. PATENT DOCUMENTS

| | | | |
|---|---|---|---|
| 776,669 | 12/1904 | Mattice | 277/67 |
| 2,063,738 | 12/1936 | Hedgecock | 277/67 |
| 2,960,356 | 11/1960 | Tyce et al. | 277/25 |
| 4,428,587 | 1/1984 | Forch | 277/25 |
| 4,531,746 | 7/1985 | Amdall et al. | 277/68 |
| 4,872,690 | 10/1989 | Dunford . | |
| 4,928,979 | 5/1990 | Nagasawa | 277/68 |
| 5,167,418 | 12/1992 | Dunford . | |

FOREIGN PATENT DOCUMENTS

0145851  11/1979  Japan ................................ 277/68

*Primary Examiner*—Daniel G. DePumpo
*Attorney, Agent, or Firm*—Jones, Tullar & Cooper, P.C.

[57] ABSTRACT

A flow controller or seal protector is positioned in a seal cavity of rotary fluid equipment to protect the shaft and seal from the effects of abrasives and entrained air. The protector has an annular ring member that is secured to the shaft for rotation therewith. A cylindrical member extends into the cavity from the outer peripheral edge of the ring member and in close surrounding proximity to the seal. At its free or open end the cylindrical member has an outwardly flared portion and flow inducing protrusions are provided adjacent that open end to help impart rotational flow to fluid moving within the seal cavity. Flow inducing vanes or vents may also be provided within the protector at the junction of the ring and cylindrical members. Heavy abrasives are moved along the interior of the protector to exit at the free end and to then be centrifuged outwardly and away from the seal. Air is centrifuged inwardly towards the back of the seal where it will do no harm.

20 Claims, 8 Drawing Sheets

FLOW CONTROLLER FOR MECHANICAL SEAL PROTECTION

This invention relates to a flow controller or seal protector which is useful in protecting mechanical seals in rotating equipment from abrasives in the pumpage, air in the pumping system, and overheating due to frictional heat. During operation of the invention dual flow patterns in the region of the mechanical seal are developed: one drives abrasives away from the seal faces, while the other drives air away from the seal faces and removes frictional heat.

BACKGROUND OF THE INVENTION

Rotary fluid equipment, such as centrifugal pumps, usually includes a rotary operative member (such as an impeller) which is driven by a prime mover (such as an electrical motor) by way of a shaft. This rotating element is contained within a stationary housing. Most pumps incorporate a mechanical seal at the point where the rotating shaft passes through the stationary housing, to prevent fluid leakage.

During operation of the rotary fluid equipment, particulate contaminant material carried into the seal area by the pumpage can damage the seal unless some type of protector is arranged to deflect them away from the area.

There have been other inventions designed to accomplish this task, such as those in commonly owned U.S. Pat. Nos. 4,872,690 and 5,167,418. These devices perform the abrasive protection function well, but both require that the pump incorporate a defined seal cavity, and necessitate machining of the pump stationary housing to enable installation. This limits the ability to use these devices in some pump designs.

Several years ago, a new configuration of seal housing was introduced onto the market. The taper bore arrangement increases the exchange of fluid around the seal, and drives air away from the seal faces, resulting in a marked reduction in seal face temperatures. The flow patterns developed in the seal cavity push air away from the seal faces, but have been identified as being responsible for entrapment of abrasives, and severe erosion of the seal cavity itself. The major flow pattern in the seal cavity is driven by frictional effects of the back of the rotating impeller on the fluid, driving the fluid radially outward, and then along the seal cavity bore towards the seal face. The flow then returns along the seal and shaft to complete the loop. Abrasives are centrifuged to the bore, where the flow forces them in the direction of the seal faces, but when they reach the area of the seal gland, they are prohibited from turning radially inward with the fluid flow, by centrifugal force. This results in the abrasives rotating in the same location until they wear out, or cause erosion on, the seal cavity and seal components.

Several newer designs have incorporated axial extensions (or strakes, or flow modifiers) on the inside surface of the conical section of the bore, in hopes of breaking up the flow pattern and avoiding the erosion of the seal housing. This arrangement can only be used in pumping applications having very low concentrations of solids however, because the particulate deflects off of the strakes and impacts onto the seal, causing failure.

The current invention establishes two flow patterns in the seal cavity, which individually drive abrasives and air away from the seal faces, while eliminating the erosion problems associated with taper bore seal cavities. The invention requires no pump modifications for installation, or operation.

SUMMARY OF THE INVENTION

The present invention provides a seal protector which is secured to the shaft and is therefore rotary in operation, as opposed to being stationary as in the prior art. This controller is intended to be applicable to a wide range of centrifugal equipment and installed without the need for machining or modification. The controller makes use of the fact that within the pump every rotating radial surface exposed to the fluid induces a flow outward from the center of the surface. It also makes use of two other commonly known concepts: abrasives of higher specific gravity than the fluid will centrifuge outwardly; and contaminants or gas lighter than the fluid will centrifuge towards the center. The behaviour of the abrasives or air when they centrifuge to the bore or shaft respectively depends upon the direction of any axial component of the fluid flow at that surface.

Generally, and in one form, the present invention provides a radial annular ring, attached at its outer periphery to, or formed integrally with, an axial cylindrical (or tubular) component that extends over the body of the mechanical seal. At the open end of the axial component is a flared portion forming a frustoconical section. At the junction of the axial portion and the frustoconical section, or on the frustoconical section, is a series of external protrusions, or bumps, that serve as flow inducers. The combination is secured to the rotating shaft by a set screwed locking ring, by being clamped by the compression of the seal against the back of the impeller, or by direct attachment to the mechanical seal or impeller, to form a shroud or cover over the mechanical seal from its back, towards the seal face. Sufficient radial space is allowed (at least ⅛ of an inch or more) between the inner cylindrical surface of the device and the outer cylindrical surface of the seal to permit fluid circulation. There is a small gap (approximately ⅛ to ⅜ inch) left open at the seal face end, between the frustoconical section and the seal gland, to permit contaminants to escape and fluid to exchange for seal face cooling. The rotational operation of the invention creates two flow patterns, an outer pattern which drives abrasives from the seal area, and an inner pattern which delivers abrasives into the outer flow, and drives air away from the seal faces, to prevent dry running and overheating.

With the pump operating, the shaft rotates the seal protector along with the mechanical seal. The rotation of the flow inducers on the outside of the axial tubular (or cylindrical) and frustoconical surfaces, drives a flow along the bore in a direction towards the impeller. This then draws a return flow back along the outer surface of the axial cylindrical section, to complete the outer flow loop. Since abrasives centrifuge to the bore, the flow pattern continuously drives them towards the impeller, where centrifugal forces move them radially outwardly along the back of the impeller and into the pumpage.

Inside the device, the frictional effects of the radial surface of the annular ring drives a low velocity flow in a radial, or outward, direction from the shaft. The cylindrical (tubular) section guides the flow axially in the direction of the seal face. Since abrasives are normally higher in specific gravity than the fluid they are centrifuged to the inner surface of the tubular section, and are driven along with the axial flow. When the abrasives reach the gap at the open end of the controller, they are centrifuged through the opening and out of the shrouded area. If the gap distance is not greater than ½ inch the fluid will flow smoothly across the gap and then radially inwardly, toward the seal face, and then axially along the outer surface of the mechanical seal back to the inner diameter of the radial annular ring, completing the inner flow loop. Since air centrifuges radially inwardly, this direction of flow will force any air accumulation away from the seal face, toward the back of the seal.

After a few revolutions the abrasives are expelled from within the shrouded volume, air is pushed to the back of the seal, and the mechanical seal operates in a clean environment.

This version would be used in the type of pumps in which the mechanical seal is directly compressed against the back of the impeller, and the stationary seat is pressed into a recess in the pump back plate. These types of mechanical seals are normally short in axial length (about ½ to ¾ inch) and are sensitive to the presence of abrasives.

A second version of the invention utilizes small vanes (or radial bumps) on the inside surface of the radial annular ring to provide a pumping action to increase the velocity of the inner circulation loop. This will be necessary for seals of longer axial length (more sophisticated seals are typically 1 to 2 inches in length) since many such designs have irregular surface configurations which can introduce unwanted vortices that must be overcome with the additional fluid drive offered by the vanes.

A third version incorporates a series of vent openings in the outer circumference of the radial annular ring instead of the impeller vanes. These vents are configured to open towards the mechanical seal and away from the direction of rotation so that the recirculating flow passing over the vent creates a suction effect which draws additional fluid into the shrouded volume. This additional flow combines with the normal circulation flow. The vents also behave as small impeller vanes to drive the total flow axially along the inside surface of the tubular member toward the gap near the seal gland, in a manner similar to that driven by the vanes of the previous version. The additional flow introduced by the operation of the vents then exits through the gap at the end of the tubular member. The exiting flow enhances the rate of particulate removal from the shrouded volume and mixes with the recirculating flow to achieve enhanced heat removal. The gap must be no shorter than ⅛ inch and no longer than ½ inch axially to ensure that undesirable vortices are not formed. This version would be used in applications where the seal requires additional cooling as is typical in many refinery and heat transfer services, in crystallizing fluids where hard seal faces are necessary, or in large diameter seals under high pressure, since greater heat generation occurs in these applications.

An enhancement to this version is to curve the radial annular ring towards the seal, just inside the radius of the vents. When this configuration is pressed against the impeller, or attached to a locking ring, an annular orifice is created to protect against plugging of the vent openings by large contaminants. It should be noted that with this design, plugging of the vents does not inhibit operation, but reduces the fluid exchanged to that of the version with the flow inducing vanes.

An additional enhancement provides for holes that pass axially through the locking ring, and connect between the two radial surfaces. The holes can be drilled, cast, or formed, and allow greater volumes of air to be pushed by the flow patterns, through and away from the seal faces in applications involving aerated fluids, or where product tanks are pumped dry.

Any of the versions can be mounted to the shaft using a locking ring with set screws, by direct attachment to the back of a mechanical seal, by compression between any two components, or by direct attachment to the impeller or other rotating component. Attachment can be accomplished by bolting, welding, or any other standard method.

The design of all versions of the current invention are appropriate for manufacturing from metal stampings, machined and fabricated assemblies, and molded from plastic, or other manmade materials, or any combination of the above.

DESCRIPTION OF THE PREFERRED EMBODIMENT

Figure 1:
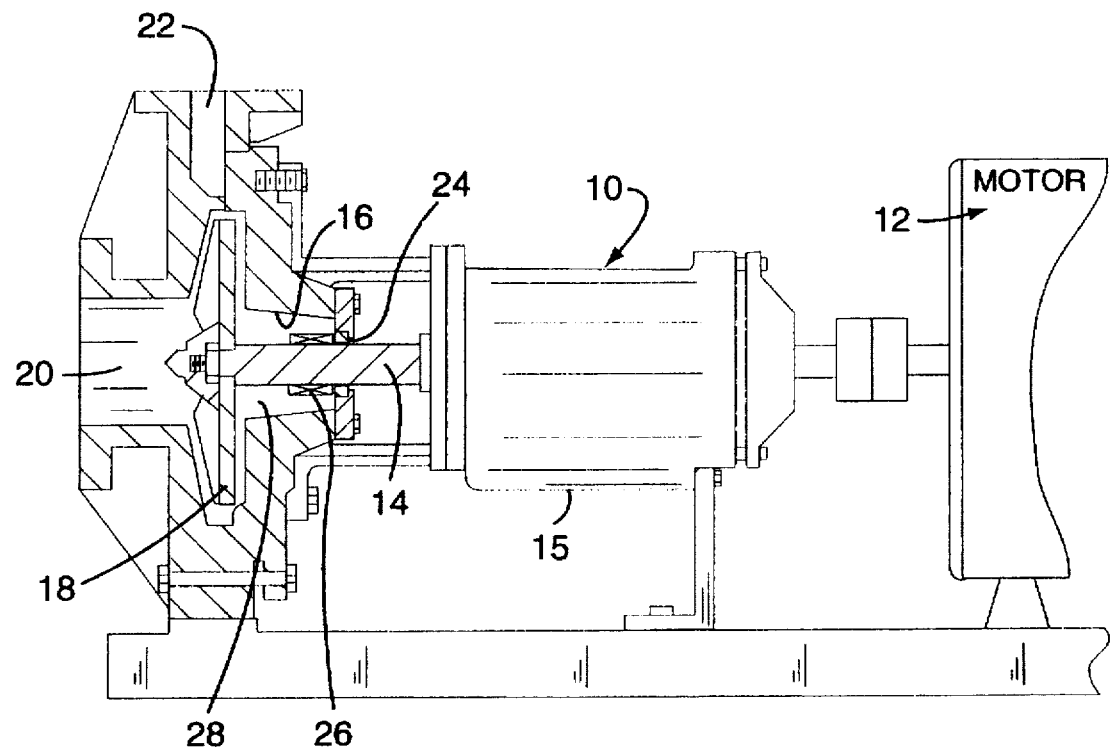
FIG. 1 shows, in partial cross section, an elevational view of a typical rotary fluid equipment in which this invention may be used.

FIG. 1 illustrates a typical environment for the device of the present invention. In this case the rotary equipment comprises a centrifugal pump 10 which is operated by an electrical motor 12. The motor drives a rotary shaft 14 connected within a tapered seal housing 16. The shaft is connected to a centrifugal impeller 18 which, as it rotates, draws fluid in through inlet 20 and pumps the fluid out through radial outlet 22. The shaft 14 is typically supported by bearings within the bearing housing 15. As seen in FIG. 1 a seal cavity 28 is defined in general by the shaft 14, the housing 16, the seals 26, and the gland 24.

Figure 2:
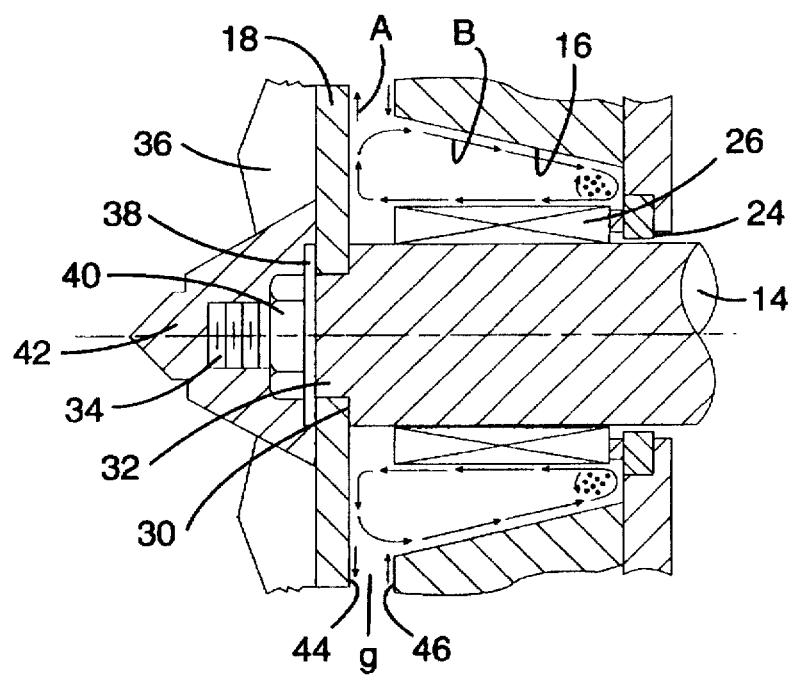
FIG. 2 shows in cross section an enlarged view of a typical seal arrangement in this type of equipment, showing fluid flow patterns around the seal area.

FIG. 2 illustrates a somewhat enlarged view of the area where the shaft 14 connects to the impeller 18. It is seen therein that the shaft 14 has a shoulder 30 with a smaller diameter portion 32 extending therefrom. A threaded portion 34 projects from the portion 32. The impeller 18, with vanes 36, fits over the portion 32 and abuts the shoulder 30. A washer 38 and nut 40 are drawn tight against the impeller 18 to clamp it to the shaft 14; and a nose piece 42 fits over the nut, washer and exposed end of the threaded portion 34. With the impeller in place there is a thin gap 8 between the inner face 44 of the impeller and the outer face 46 of the housing.

FIG. 2 also illustrates typical flow patterns within the seal cavity 28. Rotation of the impeller 18 will create a radially outward flow along the rear face thereof, designated by the arrow A. Furthermore, a flow designated by the arrow B is set up within the seal cavity, that flow extending along the rear face of the impeller, turning inwardly along the outer surface of the cavity bore to the innermost end of the cavity, where it again turns and is directed generally axially along the seal 26 towards the impeller 18. Contaminants such as abrasive particles are carried by the flow B and tend to accumulate at the innermost end of the cavity, where they can damage the seal, the gland and/or the cavity bore.

FIGS. 3 to 6 illustrate the basic form of the seal protector of the present invention. The protector 50 includes a generally radial annular ring member 52 affixed to, or formed integrally with, a cylindrical member 54 which extends in one direction from the outer peripheral edge 56 of the ring member 52. The inner peripheral edge 58 of the ring member has a diameter that is essentially the same as that of the shaft 14 over which it will be positioned.

Figure 5:
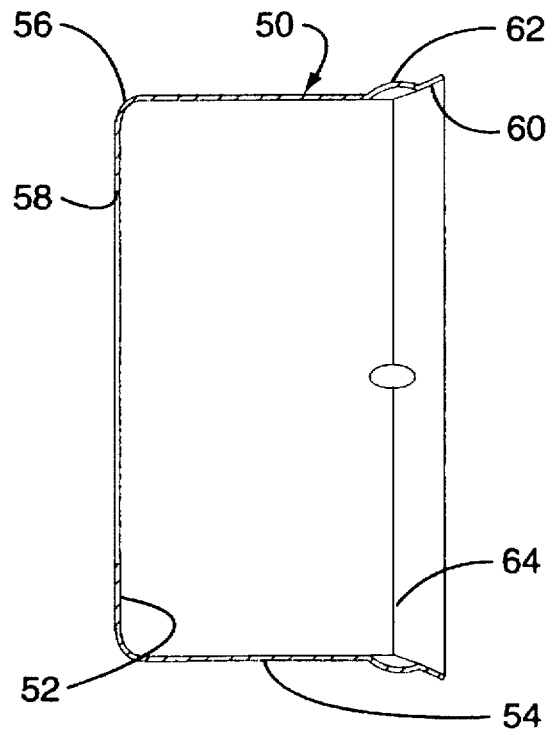
FIG. 5 is a cross section of the seal protector taken on the line 5—5 of FIG. 4.
Figure 5A:
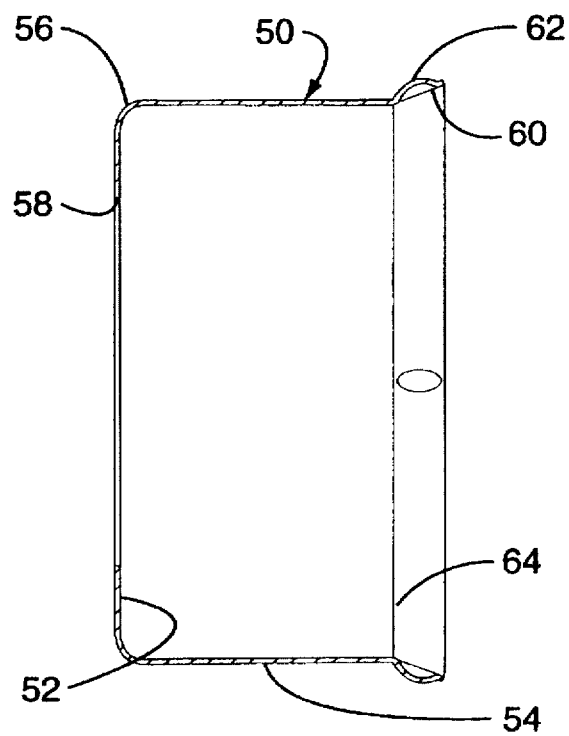
FIG. 5A shows a variant of the embodiment of FIG. 5.
Figure 6:
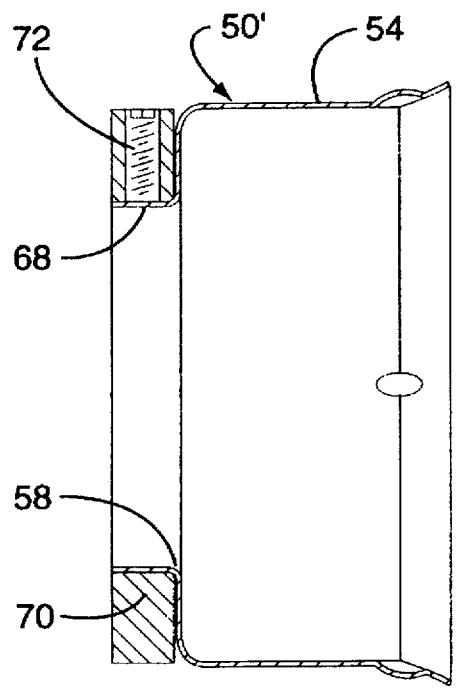
FIG. 6 is a cross sectional view similar to FIG. 4 showing a variant of the invention, using a set screwed lock ring for securing the controller to the shaft.
Figure 6A:
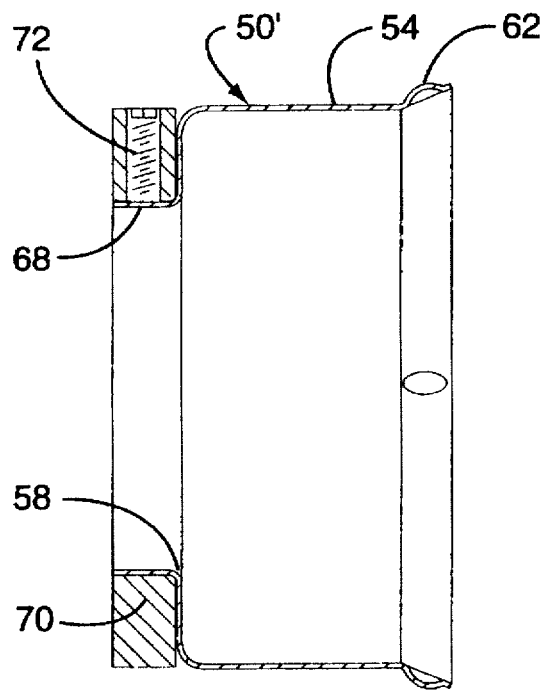
FIG. 6A shows a variant of the embodiment of FIG. 6.

At its free end the cylindrical member 54 has a frustoconical flange portion 60 which flares radially outwardly. A plurality of circumferentially spaced bumps or protrusions 62 is provided adjacent the free end 64 of the protector, which protrusions extend generally radially outwardly. As shown in FIGS. 5 and 6 these protrusions, or flow inducing means, are positioned at the transition of the cylindrical member into the flared flange portion thereof. The protrusions could easily be positioned solely on the cylindrical member or solely on the flared flange portion itself, the latter configuration being seen in FIGS. 5A and 6A.

Figure 3:
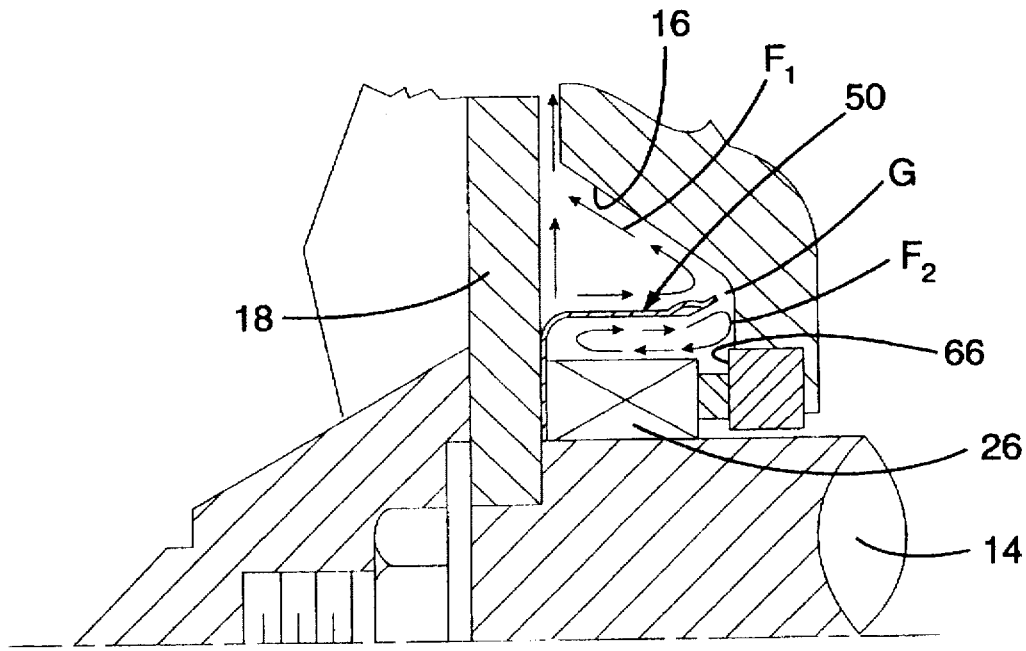
FIG. 3 shows an enlarged view with a seal protector device of the invention installed (compressed against the impeller) and flow patterns associated therewith.
Figure 4:
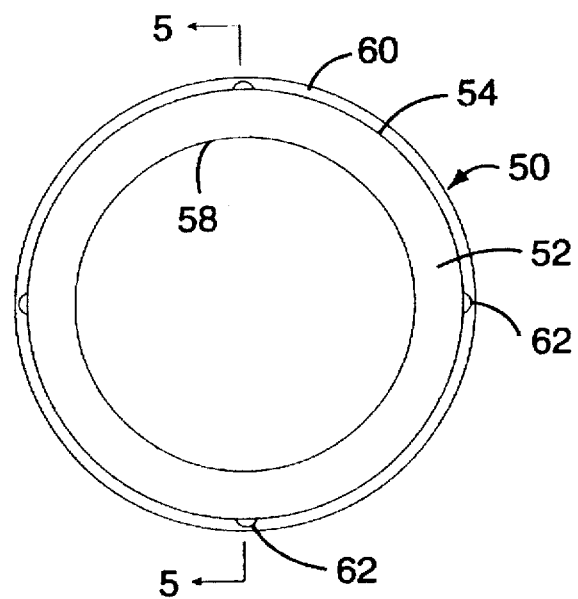
FIG. 4 is an end view of a seal protector in accordance with the present invention.

With specific reference to FIG. 3 the protector 50 is shown as being clamped between the seal member 26 and the inner surface of the impeller 18 so that it will rotate with the shaft 14 and the impeller. During such rotation two general flow patterns are established. A first pattern $F_1$ is set up by the flow inducing protrusions 62. The protrusions drive a flow along the bore 16 in a direction towards the impeller, which draws a return flow back along the outer surface of the cylindrical member 54 to complete the flow loop. Since abrasives will centrifuge to the bore, the flow pattern continuously drives them towards the impeller, where centrifugal forces will cast them radially outwardly along the back of the impeller and into the pumpage.

A second flow pattern $F_2$ is set up within the protector, the frictional effects of the ring member 52 driving a low velocity flow in a radially outward direction from the shaft. The cylindrical member 54 guides the flow axially towards the seal face 66. Since abrasives are normally higher in specific gravity than the fluid they are centrifuged to the inner surface of the cylindrical member 54 and are driven along with the axial flow. When the abrasives reach the gap G at the end of the protector they are centrifuged through the gap and out of the shrouded volume encompassed by the protector 50. If the gap distance is not in excess of ½ inch, the fluid, with abrasives being removed therefrom, will flow smoothly across the gap and then radially inwardly, along the seal face 66, and then axially along the outer surface of the seal 26 back to the inner diameter of the annular ring member 52, thereby completing the inner flow loop $F_2$. Since air centrifuges radially inwardly, this direction of flow will force any air accumulation away from the seal face, toward the back of the seal. After a few revolutions, the abrasives are expelled from within the shrouded volume, air is pushed to the back of the seal and the mechanical seal operates in a clean environment.

FIG. 6 illustrates a different mechanism for securing the seal protector to the shaft 14. In this case the protector 50' has a flange portion 68 which extends axially from the inner edge 58 of the annular ring member 52 in a direction opposite the cylindrical member 54. The diameter of the flange portion 68 is such that it has a tight fit on the shaft 14. For additional security an annular locking ring 70 fits over the flange portion and a plurality of circumferentially spaced set screws 72 are threaded radially inwardly to clamp the flange portion 68 against the shaft so that the protector 50' will rotate with the shaft.

Figure 7:
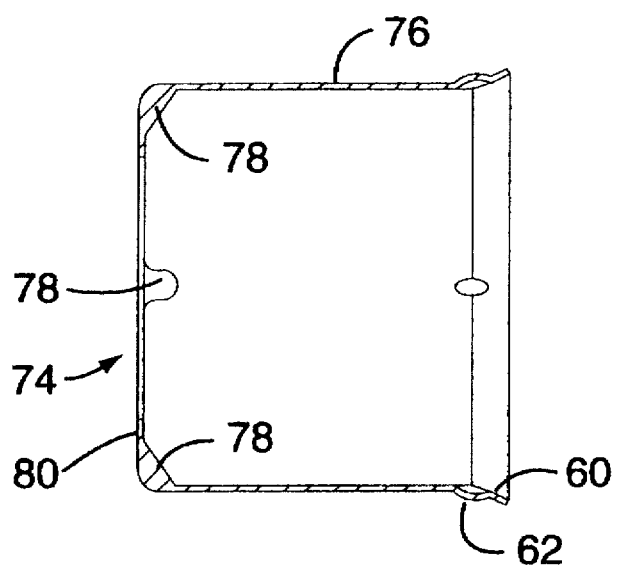
FIG. 7 is a cross sectional view showing a further enhancement to the first variant of the invention.

FIG. 7 shows another embodiment 74 of the present invention which might be used with seals of axial length longer than those with which the first embodiment might be used. While the protector of FIGS. 3 to 6 might be used with seals of about ½ to ¾ inch in length it will be seen that the cylindrical member 76 of this embodiment is longer such that the protector could be used with seals of 1 to 2 inches in length. Furthermore, this version of the present invention utilizes a plurality of vane members 78 which are provided internally of the protector at the junction of the cylindrical member 74 and the annular ring member 80. The vane members may be additional pieces attached to the inner walls of the ring and cylindrical members or they may be formed as indentations or grooves formed inwardly from the corner defined at the junction of the ring and cylindrical members. The vane members 78 provide a pumping action to the flow within the protector in the vicinity of the annular ring member 80, a necessity with the longer seal configurations with which it will be used. Such configurations may have surface irregularities on the seals which introduce unwanted vortices into the flow. The additional fluid drive provided by the vane members helps to overcome such vortices.

Figure 8:
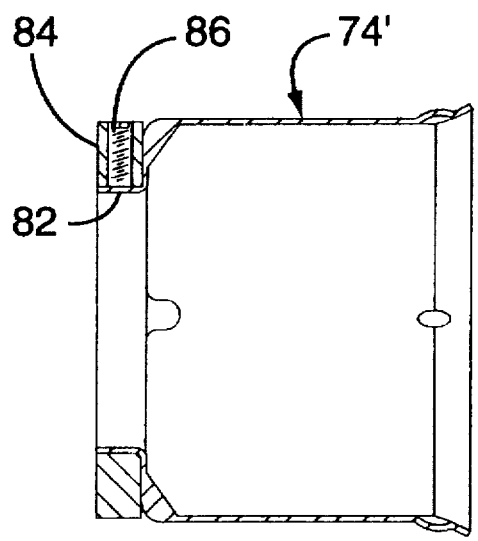
FIG. 8 is a cross sectional view similar to FIG. 6 showing a further enhancement to the second variant of the invention.

FIG. 8 shows a version 74' of the protector of FIG. 7 which has a flange portion 82 extending from the inner edge of the annular ring member, along with an annular locking ring 84 and a plurality of set screws 86 which will be used to clamp the flange portion to the shaft 14.

Figure 9:
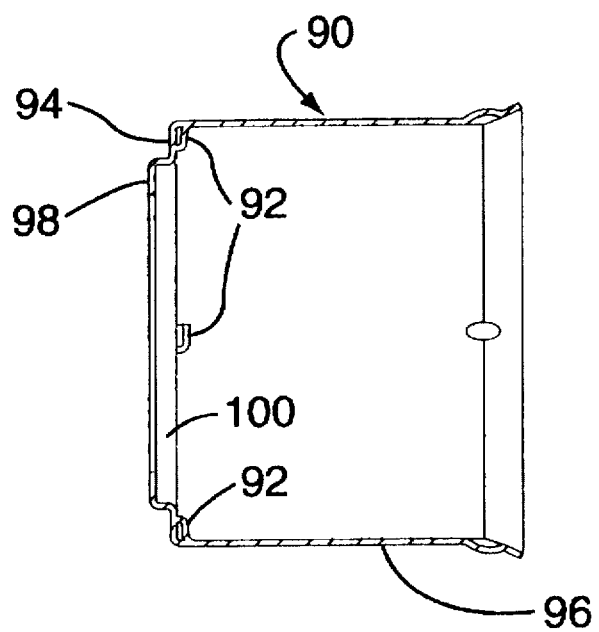
FIG. 9 is a cross sectional view similar to FIG. 7 showing an enhancement to the first variant of the invention.

FIG. 9 shows another embodiment 90 which incorporates a series of circumferentially spaced vent openings 92 along the outer periphery of the annular ring member 94. These vent openings replace the vane members of the previous embodiment and are configured to open inwardly towards the seal means, and away from the direction of rotation. The vent openings are formed in, as by molding or punching, the material of the protector. The recirculating flow passing over the vent openings creates a suction effect which draws additional fluid into the interior of the protector, which additional flow combines with the normal flow within the shrouded volume. Since the vent openings are formed to open away from the direction of rotation, they can also perform a function similar to that of the vane members of the previous embodiment, helping to drive the total flow axially along the inside surface of the cylindrical member 96 toward the gap near the seal gland. The extra flow exiting through the gap at the end of the cylindrical member enhances the rate of particulate or abrasive removal and mixes with the recirculating flow outside the protector to enhance heat dissipation. The gap between the end of the cylindrical member and the seal gland should be in the range of ⅛ to ½ inch to ensure that no undesirable vortices are produced. This version of the invention would be used if additional cooling in particular is required.

FIG. 9 also shows an optional enhancement to the protector 90, bearing in mind that the annular ring member at its inner peripheral edge could be configured as in FIG. 7 or 8, for example. In the FIG. 9 embodiment the ring member 94 has a cup-shaped portion 98 extending away from the cylindrical member 96 so as to create a gap 100 forward of the ring member itself. This gap helps to protect against plugging of the vent openings 92 by large contaminants. It should be noted that plugging of the vent openings would not inhibit operation, but there would be a reduction in fluid exchange and a consequent fall-off in efficiency of operation.

Figure 10:
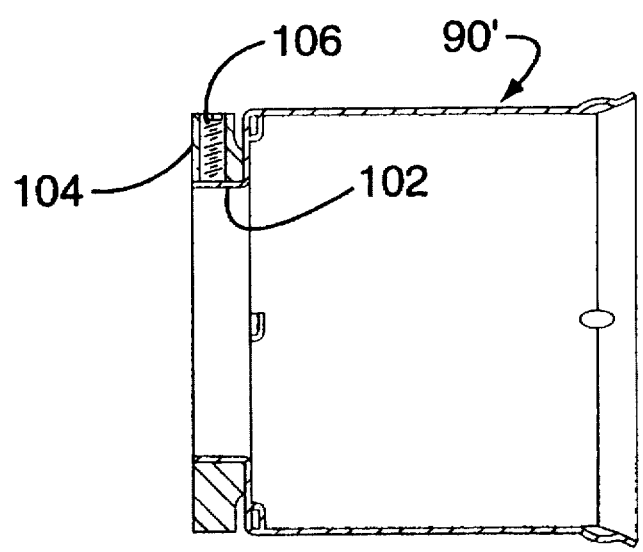
FIG. 10 is a cross sectional view similar to FIG. 6 showing a further enhancement to the second variant of the invention.

FIG. 10 shows a version 90' of the embodiment of FIG. 9 wherein a flange portion 102 extends from the inner edge of the annular ring member, and an annular locking ring 104 and a plurality of set screws 106 are be used to clamp the flange portion to the shaft 14.

Figure 11:
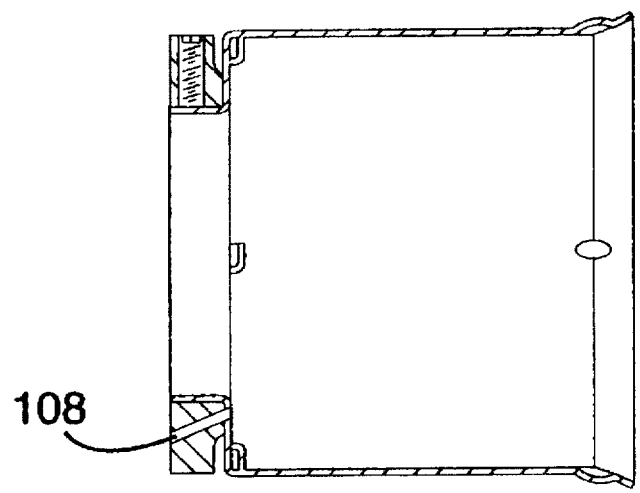
FIG. 11 is a cross sectional view similar to FIG. 10 showing a third enhancement to the second variant of the invention.

FIG. 11 shows an enhancement to any of the versions which use the flange and locking ring combination, wherein one or more holes 108 pass through the locking ring to permit greater volumes of air to be pushed by the flow patterns. This enhancement is particularly advantageous in situations involving aerated fluids or in situations where product tanks are pumped dry.

Figure 12:
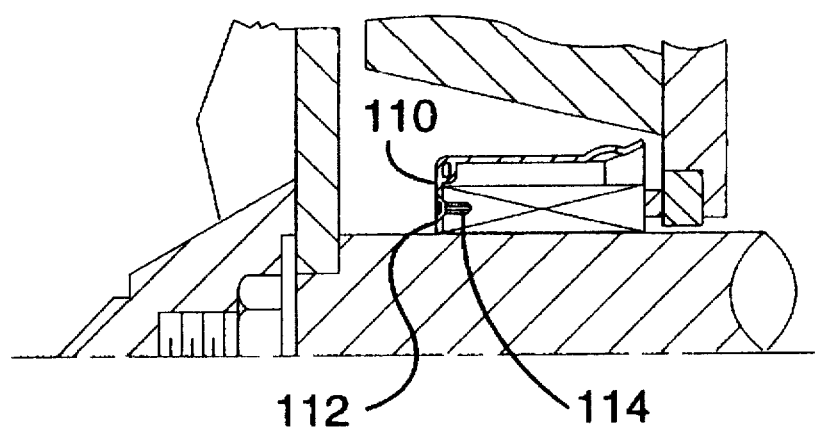
FIG. 12 is a cross sectional view similar to FIG. 11 showing the current invention mounted directly onto the mechanical seal.

FIG. 12 illustrates another mechanism for securing the protector for rotation with the shaft 14. In this version the annular ring member 110 is provided with a plurality of circumferentially spaced through holes 112 and corresponding screws 114 are used to attach the ring member, and hence the protector itself to the seal member 26. Of course, the ring member could be welded, adhered, or otherwise secured to the seal member 26 in any conventional manner.

Figure 13:
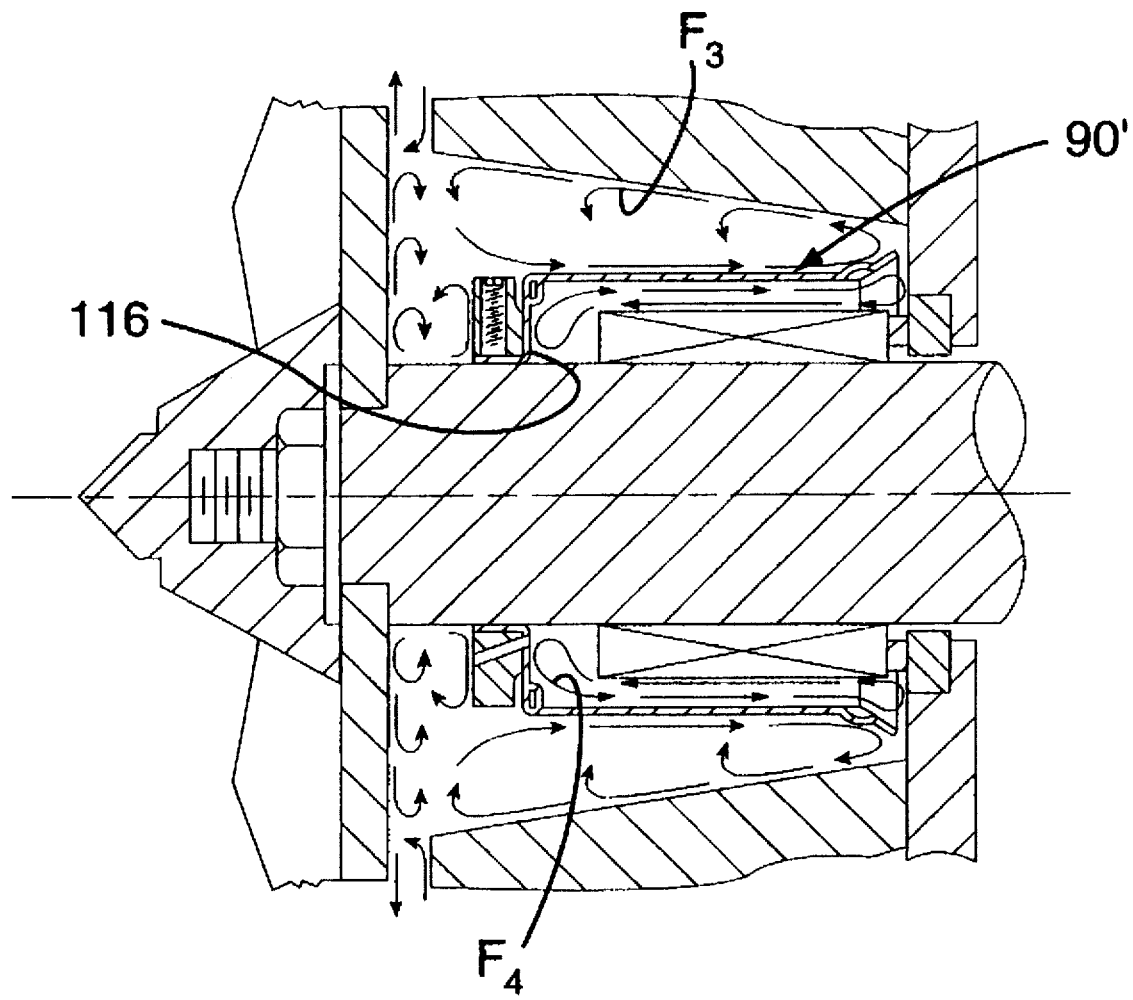
FIG. 13 is a cross sectional view similar to FIG. 11 showing the flow patterns in and around the current invention, as installed and operating in a tapered seal cavity.

FIG. 13 is similar to FIG. 3 in showing the flow patterns within a tapered seal cavity although in this case a protector 90' as seen in FIG. 10 is used, the annular ring member 116 thereof being space from the end of the seal member. The recirculating flow pattern $F_3$ is similar to that of the flow pattern $F_1$ while the internal flow pattern $F_4$ is similar to that of flow pattern $F_2$ except that there is greater flow adjacent the inner surface of the ring member 116.

All embodiments of the present invention can be manufactured from metal stampings, machined and fabricated assemblies, plastics moldings, or any other materials or combination thereof as long as such material is selected for long life within the specific environment in which it will be used.

The foregoing has described the seal cavity protector of the present invention in basic and modified forms and has indicated a number of applications therefor. Undoubtedly a skilled person could create many more variations or modification and could use the invention in a multitude of situations not illustrated herein, all without departing from the spirit of the invention. Accordingly the protection to be afforded this invention is to be determined from the scope of the claims appended hereto.

I claim:

1. A seal cavity protector for use with rotary fluid equipment, a seal cavity of which is defined by a rotary shaft having an axis, a shaft housing surrounding at least a portion of the shaft, and seal means engaging the shaft, said protector comprising: an annular ring member having circular inner and outer peripheries respectively; means connecting said ring member adjacent said inner periphery thereof to said shaft at an entrance to said cavity for rotation with said shaft; a cylindrical member extending from the outer periphery of said ring member into said cavity in close radial proximity to said seal means; said cylindrical member having an outwardly flared free end portion within said cavity; and a plurality of circumferentially spaced flow inducing protrusions on said protector adjacent said flared portion.

2. The protector of claim 1 wherein said protrusions extend radially outwardly of said cylindrical member at the juncture of said cylindrical member and said flared portion.

3. The protector of claim 2 including a plurality of circumferentially spaced vane members at the junction of said ring member and said cylindrical member internally of said protector.

4. The protector of claim 3 wherein said vane members are formed as indentations extending inwardly of said protector from the outer corner defining the junction between said ring member and said cylindrical member.

5. The protector of claim 4 including: an annular flange extending from said inner periphery of said ring member in a direction opposite said cylindrical member and of a diameter to effect a tight fit on said shaft; an annular locking ring receivable on said flange; and set screw means receivable in said locking ring to clamp said flange to said shaft so that said protector can rotate with said shaft.

6. The protector of claim 4 including means associated with said ring member for affixing said ring member to an adjacent end of said seal means for rotation with said shaft.

7. The protector of claim 6 wherein said last-mentioned means comprises a plurality of circumferentially spaced holes in said ring member and a plurality of screws each passing through a respective hole into said end of said seal member.

8. The protector of claim 4 wherein said ring member is clamped between said seal means and impeller means connected to said shaft for rotation with said shaft.

9. The protector of claim 2 including a plurality of circumferentially spaced vents at the junction of said ring member and said cylindrical member, each of said vents opening towards said seal means and away from the direction of rotation of said shaft.

10. The protector of claim 9 including: an annular flange extending from said inner periphery of said ring member in a direction opposite said cylindrical member and of a diameter to effect a tight fit on said shaft; an annular locking ring receivable on said flange; and set screw means receivable in said locking ring to clamp said flange to said shaft so that said protector can rotate with said shaft.

11. The protector of claim 9 wherein said ring member is clamped between said seal means and impeller means connected to said shaft for rotation with said shaft.

12. The protector of claim 9 including means associated with said ring member for affixing said ring member to an adjacent end of said seal means for rotation with said shaft.

13. The protector of claim 12 wherein said last-mentioned means comprises a plurality of circumferentially spaced holes in said ring member and a plurality of screws each passing through a respective hole into said end of said seal member.

14. A seal cavity protector for use with rotary fluid equipment, a seal cavity of which is defined by a rotary shaft having an axis, a tapered shaft housing surrounding at least a portion of the shaft, and seal means engaging the shaft, said protector comprising: an annular ring member having circular inner and outer peripheries respectively; an annular flange extending from said inner periphery of said ring member and of a diameter to effect a tight fit on said shaft; an annular locking ring receivable on said flange; set screw means receivable in said locking ring to clamp said flange to said shaft so that said protector can rotate with said shaft at an entrance to said cavity; a cylindrical member integrally formed with and extending from the outer periphery of said ring member into said cavity in close radial proximity to said seal means; said cylindrical member having an outwardly flared free end portion within said cavity; and a plurality of circumferentially spaced flow inducing protrusion means extending generally radially outwardly from said flared portion.

15. The protector of claim 14 including a plurality of circumferentially spaced vane members at the junction of said ring member and said cylindrical member internally of said protector.

16. The protector of claim 15 wherein said vane members are formed as indentations extending inwardly of said protector from the outer corner defining the junction between said ring member and said cylindrical member.

17. The protector of claim 14 including a plurality of circumferentially spaced vents at the junction of said ring member and said cylindrical member, each of said vents opening towards said seal means and away from the direction of rotation of said shaft.

18. A seal cavity protector for use with rotary fluid equipment, a seal cavity of which is defined by a rotary shaft having an axis, a shaft housing surrounding at least a portion of the shaft, and seal means engaging the shaft, said protector comprising: an annular ring member having circular inner and outer peripheries respectively; means connecting said ring member adjacent said inner periphery thereof to said shaft at an entrance to said cavity for rotation with said shaft; a cylindrical member extending from the outer periphery of said ring member into said cavity in close radial proximity to said seal means; said cylindrical member having an outwardly flared free end portion within said cavity; and a plurality of circumferentially spaced flow inducing protrusions on said protector extending radially outwardly of said cylindrical member at the juncture of said cylindrical member and said flared portion.

19. The protector of claim 1 wherein said protrusions extend radially outwardly of said cylindrical member adjacent the juncture thereof with said flared portion.

20. The protector of claim 1 wherein said protrusions extend radially outwardly of said flared portion.

* * * * *